April 17, 1928.
O. BÜCHNER
1,666,808
DAYLIGHT PROJECTING SCREEN
Filed June 16, 1922   4 Sheets-Sheet 1
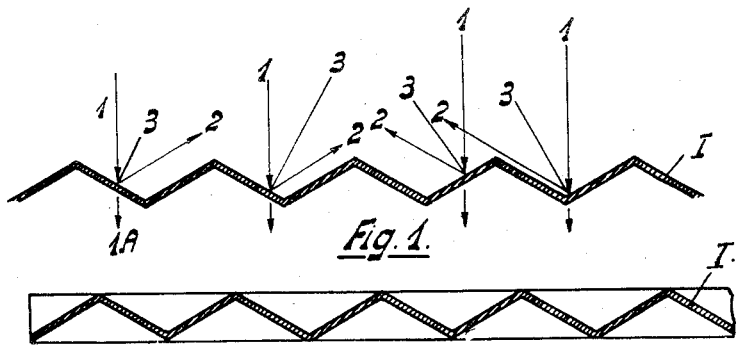
Fig. 1.
Fig. 2.
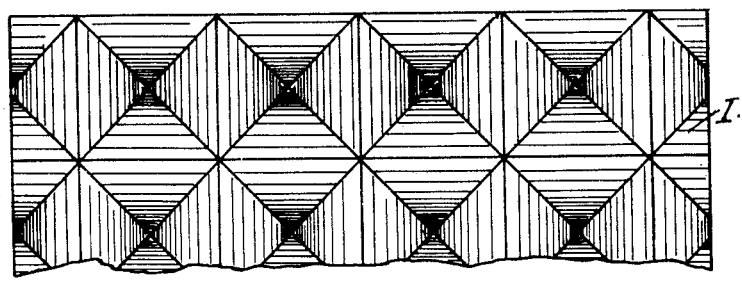
Fig. 3.
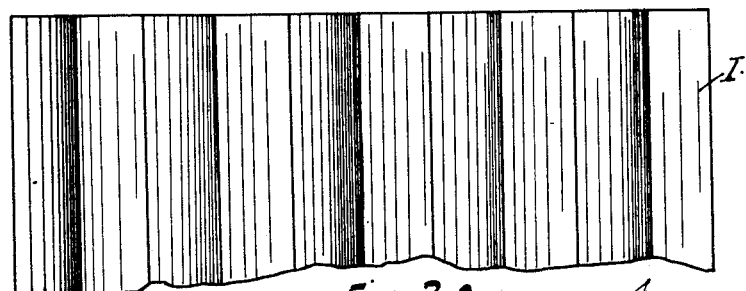
Fig. 3.A.
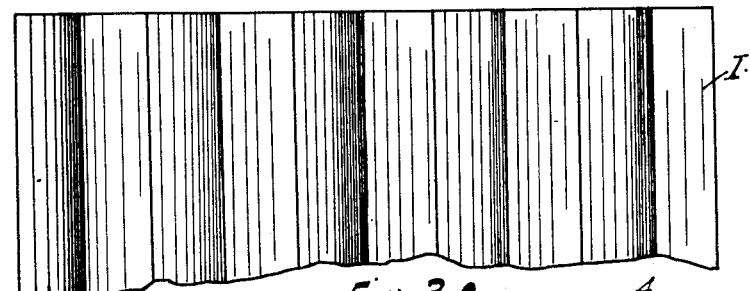
Fig. 4.
Fig. 5.
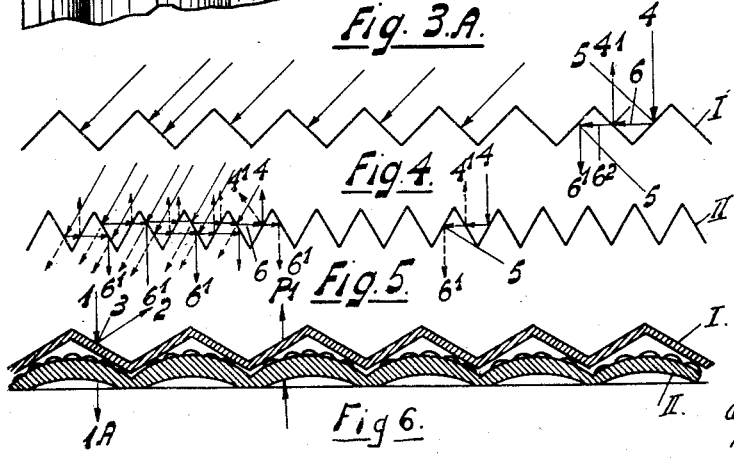
Fig. 6.

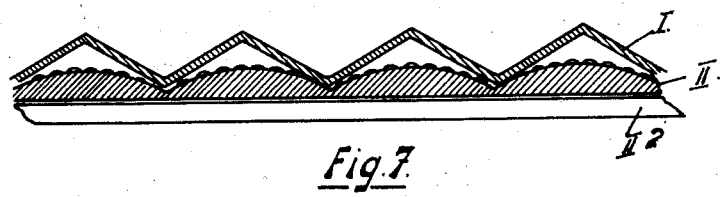
Fig. 7.
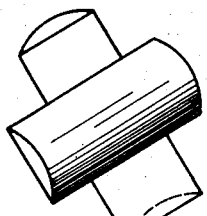
Fig. 8.
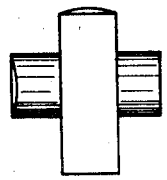
Fig. 9.
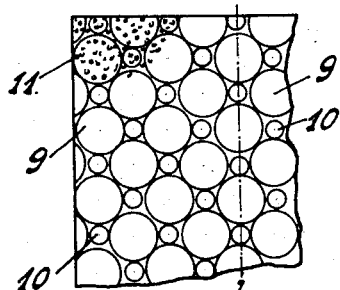
Fig. 10.
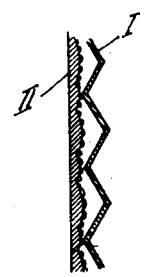
Fig. 11.
Fig. 12.    Fig. 13.
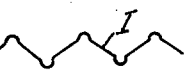
Fig. 14.
Fig. 15.
Fig. 16.

April 17, 1928.

O. BÜCHNER

DAYLIGHT PROJECTING SCREEN

Filed June 16, 1922  4 Sheets-Sheet 3

1,666,808

Patented Apr. 17, 1928.

1,666,808

UNITED STATES PATENT OFFICE.

OSWALD BÜCHNER, OF HONGG, NEAR ZURICH, SWITZERLAND.

DAYLIGHT PROJECTING SCREEN.

Application filed June 16, 1922, Serial No. 568,773, and in Switzerland June 22, 1921.

This invention relates to improvements in free light projecting screens, or daylight projecting screens, the object being to provide a screen which possesses the property that under all conditions of light in the open during the daytime, images will appear clearly thereon when employing the technically known illuminating means for projecting purposes.

The invention is based on the following theory:—

It is well known that every body reflects at least 5% of the free light rays which impinge thereon. In most cases the amount of reflected rays is considerably higher. When it depends upon the absorption of very bright daylight or even direct sunlight upon a daylight surface it is found that the reflected quantity of light is very large, even with the most suitable medium such as glass.

When no suitable means are provided, as is the case, for example, in connection with transparent screens, which render deleterious reflection ineffective, it is quite plain that images cannot be seen under these circumstances, as the quantity of reflected light prevents the formation of dark outlines, as these are either almost the same size, exactly the same size or larger than the permeating (transparent) projecting light rays, which are in the same direction as the reflected daylight rays.

From this it is recognized that it is the purpose of the daylight screen on the one hand to direct the free light rays laterally at an angle other than a right angle, and on the other hand to direct the projecting light rays which permeate through the transparency, in a dispersed manner outside the said angle, therefore within the circle of vision.

According to the present invention this double purpose is solved by forming the screen of at least two transparent parts, the lateral deviation of the reflected daylight rays being directed laterally at the angle to the outer parts thereof. These parts are completely permeable to light and transparent, so that the projecting rays which have passed through the first parts of the screen are not diverted to any extent by the first parts and thus appear sharply within the angle of vision as bright and dark outlines of images.

The division of the daylight screen into a number of parts has been conceived by reason of the fact that by constructional researches and experiments with various shapes, no shape could be found by means of which the object in view could be obtained with a single surface; for example, the combination of the alternate arrangement of a groove, which serves the purpose of daylight reflection, and a row of lenslike structures combined in a common plane, led to an unsatisfactory result, as is generally known in connection with transparent screens.

According to the present invention only the so-called bright rays are used in order to render the light images visible. These include: The white, the yellow and the bright portion of the red rays. The photo-chemically active, the violet, ultra-violet, ultra-red, the blue are in the case dark rays which are unessential for light images in daylight, as these are not sensitive to the human eye as brightness.

The invention is also based upon the idea that the part of the direct superficial reflection, which is not destroyed or diverted by the first part of the screen, and which would pass in the same direction as the transparent reflected rays, would be converted into dark rays when striking the screen.

It is therefore also the object to prevent any white daylight, which may have been reflected, from appearing white and to render it dark. This is effected by providing the superficial surface of the first part of the daylight projecting screen with a suitable colouring material, in an empirically tested thickness. A suitable colouring material is for example fast indigo.

For example, the first part of the daylight screen may consist of a corrugated transparent sheet, whereby the portion of the daylight which does not pass there-through is diverted laterally at the angle, so that this can no longer have a deleterious effect upon the observation of the image.

The second part of the projecting screen consists of an effectively constructed transparent member, preferably fairly small lenses of the type of optical lenses, and about 1 mm. in diameter, of which the curved surfaces are in turn covered with still smaller optically effective lens elements.

For example, concave cavities may be provided on the rear side of the main lenses. It will of course be understood that other constructional arrangements, according to the known optical laws, are possible, as in this case, for example, convex shapes, which show the same action as concave shapes, or collecting or dispersing lenses.

It is also possible to again divide the transparency so that it consists of two parts, where both parts are arranged with developments in the form of cylindrical lenses according to Figs. 8 and 9, and the parts are placed one behind the other in such a manner that the developments in the form of cylindrical lenses cross one another in the manner of a marine reflector. These may also be covered with dark colorations and small lens-like developments.

The colorations may only be used slightly thinned, as the transparency must not be obstructed.

The subject of the present invention also provides a further technical advance in the following respect:—

In practice it has been found that animal organic, hygroscopic substances are suitable materials for the transparencies, and amongst others fine animal skins. By reason of the hydroscopic degree of these substances these technically favorable and most complete transparencies cannot be exposed in the open in the damp atmosphere of damp air, as first the optical action of such a transparency is reduced and finally, it loses its firmness when it has absorbed sufficient water. This is also the reason why the best transparent screens are not used for advertisements in the open.

According to the present invention this most suitable hygroscopic, animal or vegetable substance is used for the production of the corresponding transparency. By choosing a non-hygroscopic material such as glass, celluloid and so forth for the reflecting screen, the hygroscopic transparency placed behind it is protected from the dampness of the air and can therefore be exposed in the open to the weather, without varying optically in a disadvantageous manner.

As however the expansion of hygroscopic substances continually varies relatively to non-hygroscopic substances attention has been paid to this circumstance according to the present invention in a practical manner, in that the two substances, placed close one over the other, are each stretched in a suitable manner in a supporting frame, the second frame for the hygroscopic substance being made suitably flexible.

According to the present invention the reflecting screen may also be replaced by flat, entirely smooth glass plates in such a manner that these are placed at a determined angle relatively to the transparent screen and preferably such that the free light rays are not reflected in the same direction as the projecting light rays.

Further, the reflecting screen may also be replaced by inclined, transparent, narrow strips arranged in the manner of Venetian blinds. Such an arrangement has the advantage that it can be rolled up or collapsed in the manner of Venetian blinds.

In the accompanying drawings:

Figure 1 is a detail transverse sectional view of the upper or outer element of my improved daylight projecting screen.

Figure 2 is a similar view showing a modified form of said element.

Figure 3 is a plan of the form of said element shown in Figure 2, and

Figure 3ª is a similar view of the form of the element shown in Figure 1.

Figure 4 is a diagrammatic section of another form of said element.

Figure 5 is a similar view of another modified form of the same in which the angles are acute.

Figure 6 is a transverse sectional view of my improved screen.

Figure 7 is a similar view showing a modified construction of the screen.

Figure 8 is a detail view showing the arrangement of lenses according to Figure 7.

Figure 9 is a similar view showing a modified arrangement of the lenses.

Figure 10 is a detail plan of the transparency element.

Figure 11 is a detail sectional view of the same on the line a—b of Figure 10.

Figure 12 is a diagrammatic section of a modified form of my improved screen.

Figure 13 is a similar view of another modified form thereof.

Figures 14, 15 and 16 are similar views of other modified forms of my improved screen.

Figure 17:
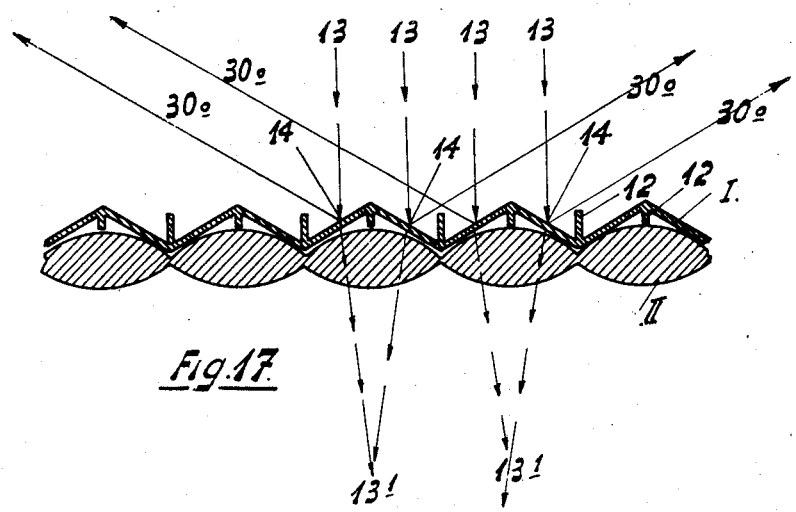

Figure 17 is a sectional view of a modified form of my improved screen.

Figure 18:
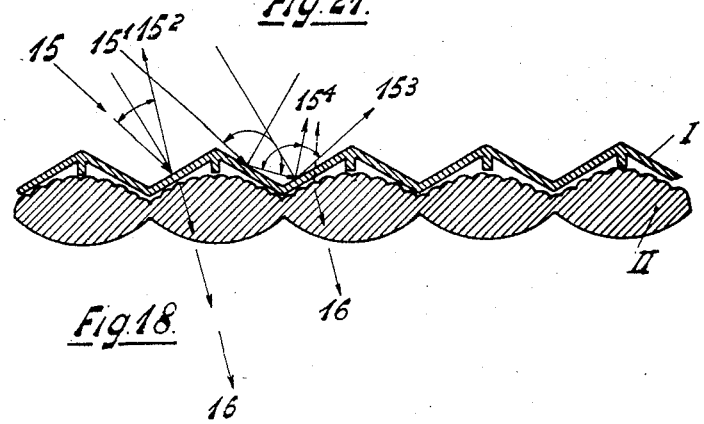

Figure 18 is a similar view of another modified form of the same.

Figure 19:
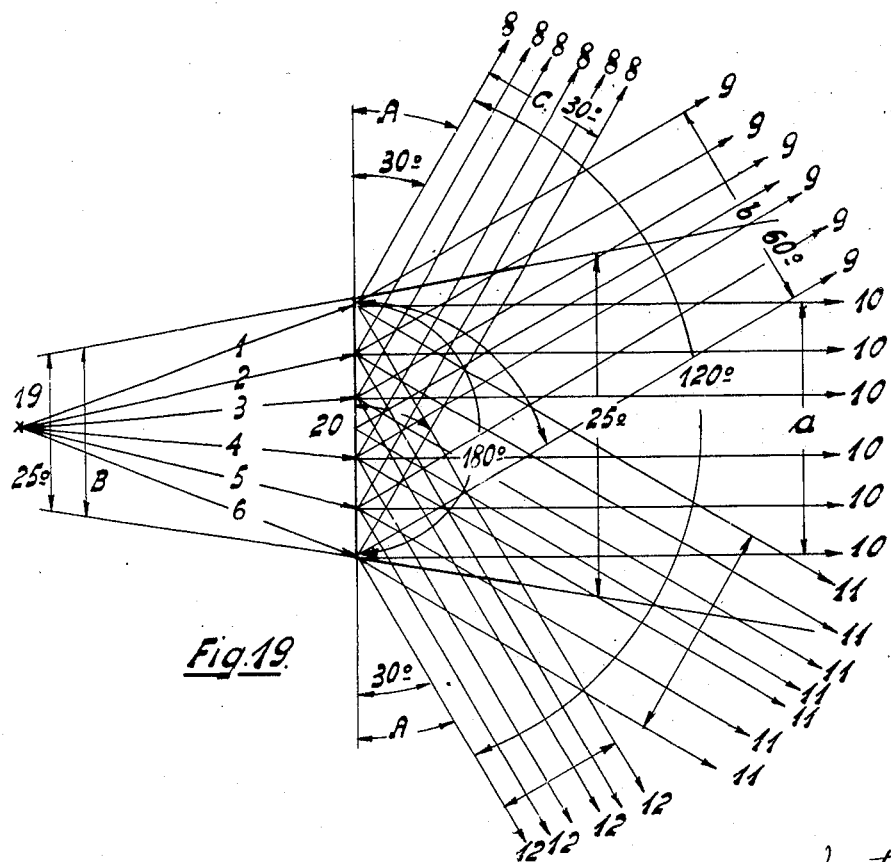

Figure 19 is a diagram illustrating the theory of operation of my improved screen.

Figure 20:
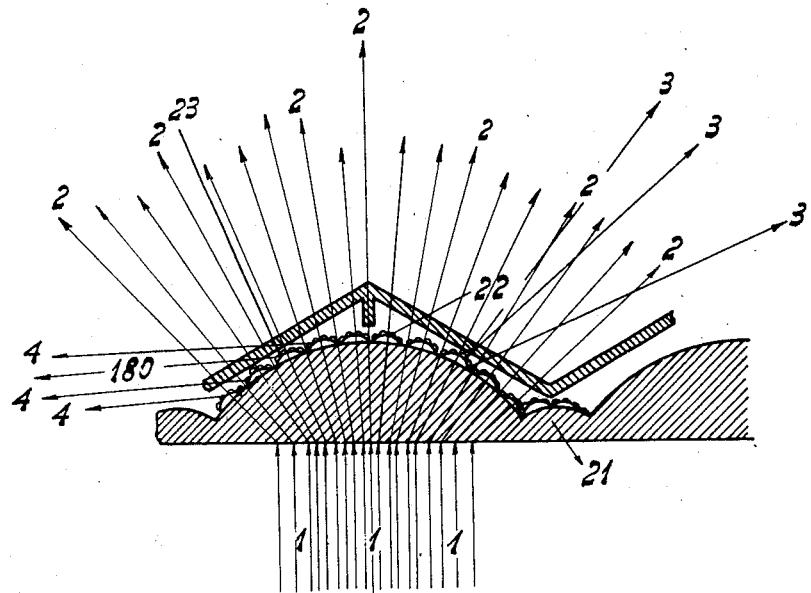
Figure 21:
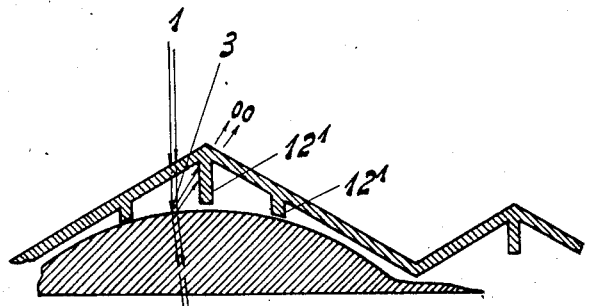

Figures 20 and 21 are sectional diagrams also illustrating the theory of operation of the same.

The screen element I as shown for example in Figures 1, 2, 3, 4, 5, 6, 12, 13, 14, 15 and 16 is an essential feature of the invention and fulfills the conditions, first that the remainder of the light striking thereon in a straight line is not in the same direction as the penetrated projected light rays, but is diverted outside these at a dead angle; second the smallest residuum of the reflected rays, which still reflect in the same direction are converted into so-called dark colored residua.

The screen element I is completely flat and transparent and is coated on the surface with thinly applied dark coloring matter. The surface may also be lightly etched in order to cause the coloring matter to more firmly adhere, but flat reflecting surfaces with the applied coloring matter must be again produced as rough surfaces have a dispersing effect and no longer divert the reflected light at the desired angle. The variously shaped reflecting surfaces illustrated serve the same purpose and are so arranged as to divert the free light.

The absorbing screen II is here shown in Figure 6 as provided with optical concaval-convex lenses of which the curved surfaces are coated with small convex lenses. It is preferable to bring the surface of the screen II very close to the screen I.

The construction may be such that a different kind of light diverting material is cast in the screen I and the screen II is pressed into this so that a solid combination is produced. For example if the screen I were formed of glass the screen II of a celluloid-like plastic mass, the connecting and other light reflecting medium could be of glue or a gelatin mass. The various mediums may be toned with reference to one another in various ways, or together produce a toning which is not obstructive to the rays to be passed through.

In the form shown in Figure 7 I indicates the uppermost screen, II and II' a double transparency of which each layer has a convex enlargement of the character of the cylindrical lenses shown in Figures 8 and 9. The surfaces II and III are so applied that the convex enlargements are not crosswise and replace a spherical lens.

The surface of the cylindrical developments are coated with small convex lenses. The same effect may be obtained with other suitable shapes as in connection with the shaping of the surface it only depends upon providing a number of small light points which form as small a surface as possible, for example one mm.$^2$, direct, within the desired angle of vision, as many bundles of rays as possible and distributed as uniformly as is possible.

In Figure 10, 9 indicates individual localized portions here shown as lenses of large size. Smaller individual localized portions 10 here shown as lenses fill the intervals between the lenses 9. 11 indicates the coating with a small lens structure.

In the form of the invention shown in Figure 17 the transparency screen II is formed of biconvex lenses and the screen I is provided with a fin 12 at the apices of the surfaces. This fin 12 is blackened on both vertical sides to secure increased effect. The fins may also be arranged crosswise in the form of squares, if preferred, as illustrated in Figures 2 and 3.

Figures 18, 19 and 20 serve to explain the theoretical path of the rays to be considered, which form the basis of the constructions, arrangements or detail shapes of the screen according to the present invention, and as hereinbefore described.

In this figure the impinging bundle of light rays is indicated at 13, these striking the surface of the screen in the direction of the arrows. The greater part of these penetrate through the screens I and II in the direction 13'. The reflected residuum is diverted at an angle of 30°. In this case 14 indicates the perpendicular.

Figure 18 illustrates the free light 15 and 15' impinging in a lateral direction, and illustrates its path. The largest portion of the bundle of rays 15 and 15' penetrates in the direction 16 and is finally completely absorbed by a light absorbing background. The reflected remainder of the bundle of rays 15 rebounds in the direction of the arrow as a so-called dark colored residuum $15^2$ and in the same direction as the projected light rays.

The ray 15' is treated in the same manner. The same rebounds in the direction $15^3$ and penetrates at the diverted positions for the most part through the screen and finally passes through the screen II in the direction 16.

Reflected residua for this bundle of rays 15' pass in the direction $15^4$, therefore in the same direction as the projected rays.

By observing the impinging free lateral light it will be recognized that the superficial coloration for the purpose of diverting the bright light rays and the darker ones is very important. In practice, however, it is only necessary to deal with the light impinging in a straight line and the coloring of the surface may be omitted.

If, however, it is desired to reduce reflections $15^2$ and $15^4$ passing in the same direction, the arrangement is formed according to Figures 12, 13, 14, 15, 16 and others. The greatest effect is obtained after the manner of the amplitude surface according to German State Patent No. 312. The greater the diversion of the free light, the better the effective action obtained by means of quite small projecting sources of light, even against the brightest and direct sunlight. In bright sunlight it is also possible by means of hollow mirrors or other suitable arrangements to use reflected sunlight as the projecting source of light, which is an important advantage in countries where there is a good deal of sunlight.

Figure 19 shows the path of the light rays of the projected light 19. 1, 2, 3, 4, 5 and 6 indicate lines, which show the direction of the bundle of rays of the projected light, which should here be observed.

20 indicates the daylight projecting picture screen. The bundle of rays passes through the screen and is dispersed by this in the directions 8, 9, 10, 11, 12. The same applies to the bundles of rays 2, 3, 4, 5, 6. It may therefore be said, that, for example, a bundle of rays 1 mm. in diameter in cross section will be seen at any point of the screen within an angle of 120°, as a light point. The angle A of 30° from the plane of the screen is that in which the reflected free light rays, impinging in a straight line, are diverted. Within the angle A a light image will not be seen in broad daylight or sunlight. In fact no image should be visible in this angle.

The distortion of surface images increases with the lateral angle. The ratio of the increasing distortion is clearly seen in Figure 19, Sheet 3. 10ª indicates the rays passing in a straight line which indicate a straight line field of vision of 18°, therefore the screen in its actual width. The images observed in a straight line are not distorted.

The rays b at an angle of 60°, indicated by 9, already show that the width of the field of vision is reduced and the distortion of the image commenced.

The rays c at an angle of 30°, indicated by 8, show a considerable reduction of the field of vision relatively to the width in comparison with the actual width of the screen.

From this it will be seen that it is preferable to construct the shape of the ray dispersing transparency in such a manner that the dispersion is uniform up to almost the dead angle of 30°. A larger dispersion of rays will be effected at the expense of the total brightness of the projected image and is therefore purposeless.

The normal image is to be looked for between the angular limbs of the space 8 of 25°.

The transparencies for through projection hitherto known differ from the present invention by reason of the fact that these have not developed a constructional arrangement of their superficial shape according to the principles of Figure 19. Moreover this is purely accidental and arbitrary.

A further difference between the known transparencies and this invention consists therein that according to the latter, by means of the provision of known optical shaped bodies, there is attained that within the angle of vision of 120° the image on the screen appears uniformly bright from every point of view of the field of vision.

The known transparencies all show the same appearance that with the commencement of the lateral angle the brightness of the picture field is immediately reduced.

For this reason the transparency herein described is in itself a technical improvement.

In Figure 20 a modification consists in a construction to divert light rays in a field of vision in a completely extended angle of 180°.

Naturally the observation of the picture at the extended angle is nonsense. According to the present process the false statement that it is not possible to render uniformly visible an image or a field of vision on a transparent screen at any angle, even at the extended angle, which can be used for signal purposes, is refuted. This is obtainable by reason of the fact that according to Figure 20 small lens bodies 23 are provided on the lens bodies 21, Sheet 4, on which are provided still smaller lenses 22. In this Figure 21 the light rays which pass through a main element 21 will be followed; they are indicated by 1 and pass through the main body 21 at the angle 2. The applied lens shapes 23 cause a different angular dispersion of the rays passing through them, which is indicated at 3, and this varies in direction according to the variability of the position. Finally a portion of the rays impinges upon the smallest applied lenses which cause a diversion 4 of the rays up to the angle of 180°.

In the form of the invention shown in Figure 21 the fins 12 are blackened at the dotted sides and the narrow sides of said fins are not blackened. The blackened side serves for the observation of the free bundle of rays 1 coming in a straight line, which impinge upon an implied small element as at 22 in Figure 20. The largest portion of this quantity of rays passes through in the direction 2. The remainder is diverted at an angle in the direction o, 3 indicating the perpendicular. This reflected ray residuum strikes the blackened fin surface and is hence absorbed.

Having now particularly described and ascertained the nature of my said invention and in which manner the same is to be performed, I declare that what I claim is:

1. A daylight screen comprising a plurality of superposed transparent elements, the outer element being arranged to divert the light rays, and the inner or rear element being arranged to absorb the light, the said outer element having a surface presenting angular local portions which diverge in opposite directions, and said absorbing element having a surface which is presented to said outer element and which surface is made up of localized portions forming collections which are arranged at an angle to the associated angular surfaces of the first named element, each of said members being colored to make the same translucent.

2. A daylight screen comprising a plurality of superposed transparent elements, the outer element being arranged to divert the light rays, and the inner or rear element being arranged to absorb the light, the said outer element having a surface presenting angular local portions which diverge in opposite directions, and said absorbing element having a surface which is presented to said outer element and which surface is made up of localized portions forming collections which are arranged at an angle to the associated angular surfaces of the first named element, each of said members being differently colored and hence translucent.

3. A daylight screen comprising a plurality of superposed transparent elements, the outer element being arranged to divert the light rays, and the inner or rear element being arranged to absorb the light, the said outer element having a surface presenting angular local portions which diverge in opposite directions, and said absorbing element having a surface which is presented to said outer element and which surface is made up of localized portions forming collections which are arranged at an angle to the associated angular surfaces of the first named element, each of said members being differently colored to make the same translucent, the absorbing member darker than the first named member.

4. A daylight screen comprising a plurality of superposed transparent elements, the outer element being arranged to divert the light rays, and the inner or rear element being arranged to absorb the light, each of said elements being colored, and said rear element being darker than said outer element, the said outer element having a surface presenting angular local portions which diverge in opposite directions, and said absorbing element having a surface which is presented to said outer element and which surface is made up of localized portions forming collections which are arranged at an angle to the associated angular surfaces of the first named element, said outer member being provided with fins arranged at an angle thereto.

5. A daylight screen comprising a plurality of superposed transparent elements, the outer element being arranged to divert the light rays, and the inner or rear element being arranged to absorb the light, each of said elements being colored, and said rear element being darker than said outer element, the said outer element having a surface presenting angular local portions which diverge in opposite directions, and said absorbing element having a surface which is presented to said outer element and which surface is made up of localized portions forming collections which are arranged at an angle to the associated angular surfaces of the first named element, said outer member being provided with transparent fins arranged at an angle thereto.

6. A daylight screen comprising a plurality of superposed transparent elements, the outer element being arranged to divert the light rays, and the inner or rear element being arranged to absorb the light, each of said elements being colored, and said rear element being darker than said outer element, the said outer element having a surface presenting angular local portions which diverge in opposite directions, and said absorbing element having a surface which is presented to said outer element and which surface is made up of localized portions forming collections which are arranged at an angle to the associated angular surfaces of the first named element, said outer member being provided with fins arranged at an angle thereto, said fins having blackened side walls.

7. A daylight screen comprising a plurality of superposed transparent elements, the outer element being arranged to divert the light rays, and the inner or rear element being arranged to absorb the light, each of said elements being colored, and said rear element being darker than said outer element, the said outer element having a surface presenting angular local portions which diverge in opposite directions, and said absorbing element having a surface which is presented to said outer element and which surface is made up of localized portions forming collections which are arranged at an angle to the associated angular surfaces of the first named element, said outer member being provided with fins arranged at an angle thereto, the said fins being arranged in the form of nets in figures.

In witness whereof I affix my signature.

OSWALD BÜCHNER.